Sept. 25, 1962 K. PREISSLER 3,055,047
APPARATUS FOR MAKING CAMS OF THERMOPLASTIC MATERIAL
Filed July 31, 1959
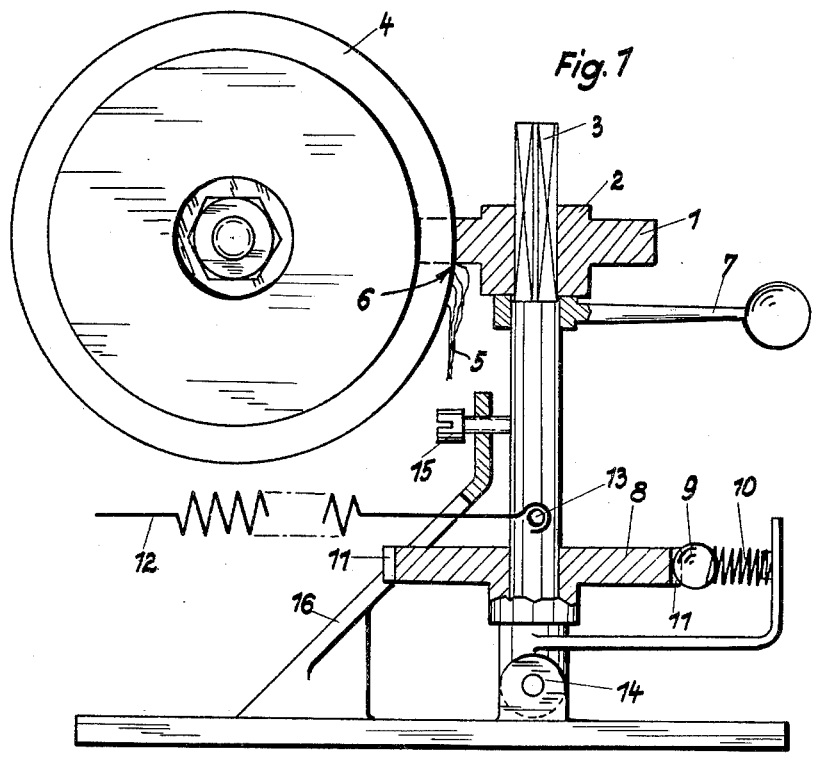
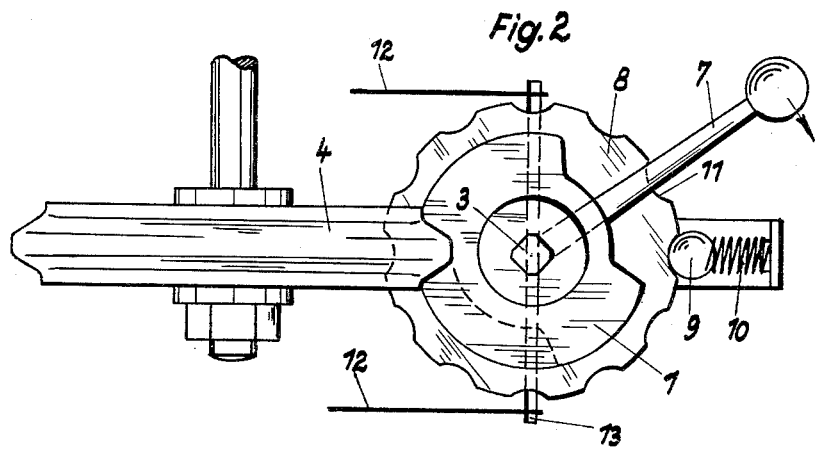
Inventor
KARL PREISSLER
by *Kurt Kelman*
HIS AGENT United States Patent Office 3,055,047
Patented Sept. 25, 1962

3,055,047
APPARATUS FOR MAKING CAMS OF
THERMOPLASTIC MATERIAL
Karl Preissler, Vienna, Austria, assignor to Hubert
Laurenz Naimer, Vienna, Austria
Filed July 31, 1959, Ser. No. 832,878
Claims priority, application Austria Aug. 18, 1958
1 Claim. (Cl. 18—1)

The present invention is generally concerned with the problem of shaping a thermoplastic molding by machining in order to make it suitable for a specific purpose. This does not refer to machining to improve the finish because this is not necessary, as a rule, with present injection molding methods, but to a substantial change in the shape of this member.

More particularly the present invention relates to the manufacture of cam members from thermoplastic disc-shaped blanks. Such cams are used in electrical switches for operating the contact bridge. It is known that the switching programs to be performed by a combination or multiple switch consisting of several individual switches depends on the shape of these cams. For frequently occurring switching requirements it is obviously possible to provide injection molds for several, frequently required cams and to use these molds to manufacture cams which need not be subsequently machined. However, switches for special functions are also required in practice but are needed only in smaller quantities. In these cases it would be much more economical to machine the necessary cam profile from a solid circular body. For this purpose, cam members are injection-molded which have initially a circular cam shape but in other respects have the form of a cam as soon as the cam profile has been machined into the circular disc.

This machining is extremely difficult with plastics which are particularly suitable for the manufacture of switch cams in view of their general properties (strength, toughness, elasticity, etc.)

It is known and not difficult to cut lower-grade plastics with so-called fusion cutting discs, which consist of narrow metal discs which rotate at high speed and act on the material with their rim, penetrating the material by causing a local fusion of the plastic as a result of the heat of friction. In this connection the difficulty arises, however, that a cam disc is to be made, which requires the removal of material over a substantial or even very large part of the periphery in conjunction with an initial shaping of the sides of the cam, rather than a formation of mere radial cuts in a disc. For economical reasons this problem must be solved in such a manner that a subsequent machining is entirely or virtually entirely superfluous and because cam profiles of widely different kinds are concerned in practice it will be understood that the equipment to be used in the present connection must be designed to enable a selective removal of a larger or smaller amount of material from the periphery of an initially solid disc. This means that only a peripherally proceeding removal of possibly very large amounts of material will be appropriate. This cannot be performed with the fusion cutting disc.

This invention relates to a method of manufacturing cams for electrical equipment, particularly switches, from a substantially circular thermoplastic blank and resides in that material is first removed from this blank in a direction proceeding toward its center by the fusion cutting method using a fusion cutting disc rotating at high speed, whereafter a portion of one profiled side rather than the rim of this disc is forced against the portion of the blank adjacent to the periphery thereof while said disc performs a peripheral feed movement relative to the circular blank, whereby the softened material is removed so as to form the cam profile, the disc being designed for adequate lateral stiffness for this purpose.

It must be considered surprising that this method enables the removal of material from a relatively large area, virtually of the entire one side of the cam, and over any required peripheral angle, which may be as large as, e.g., about 330°, without difficulties arising regarding the discharge of material and without a re-bonding of the removed material to the remainder of the disc. On the contrary, the application of this method results in entirely satisfactory cams which are ready for use virtually without subsequent machining. In accordance with one feature of the invention this method is carried out with an apparatus which is characterized in that a support is provided for the circular disc, which support is arranged to perform a feed movement in two directions relative to the rotating fusion cutting disc, suitably between adjustable stops.

In the accompanying diagrammatic drawing, which serves also for illustrating further features of the invention, the principle of working according to the invention is explained with reference to a simple apparatus according to the invention for machining a blank for a switch cam. The illustration is restricted to the most essential aspects. FIG. 1 is a side view and FIG. 2 an appertaining top plan view.

In the drawing, 1 is a cam member of thermoplastic material, e.g., of a superpolyamide having a high melting point and high strength. This workpiece may be mounted with its profiled hub 2 on a holding mandrel 3. The tool is represented as a rotating metal disc 4 which may consist of steel and has such a thickness that a cam recess of the smallest width occurring can be formed therewith. For this purpose it is fed radially toward the center of the member 1 like a known fusion cutting disc. This disc, which is mounted on a shaft 4' operated by a motor, not shown, acts thus with moderate pressure frontally on the rim of the workpiece 1, which is thereby heated and locally fused or softened so that particles of material are axially displaced by entrainment with the disc 4 and deposited at 5 in the form of a beard, which solidifies, as is known per se in the fusion cutting method.

This beard can very easily be sharply broken off the workpiece along the machined edge 6 so that no further machining is necessary.

The periphery of the disc 4 may be smooth or, to promote the generation of heat, it may have a rough or wave-shaped surface, which does not cut but only increases the friction.

Being fitted with its hub 2 on the mandrel 3 the blank for the cam can now be rotated by means of the handle 7 about this mandrel. A disc 8 in conjunction with a ball 9 urged by a spring 10 into notches 11 of the disc 8 provides a detent means which in the present example enables a convenient rotation of the blank for the cam in steps of 30°. This apparatus complies with the requirement that switching angles of 30° and multiples thereof are usual in the manufacture of switches. It is obvious, of course, that any other angular pitch may be used if this is required by special circumstances. After the tool 4 has radially penetrated the disc it will now also remove in the peripheral direction a predetermined peripheral portion, which depends on the switching program to be performed by the switch. In the present example the cam should be given the peripheral shape indicated by a broken line whereas the shape shown by a solid line has already been attained. In this machining operation a beard of material similar to 5 is again formed and can be broken off the machined workpiece 1.

The springs 12 act by means of a cross-pin 13 on the shaft 3, which is rotatable in a bearing 14 so that the workpiece is forced against the disc 4. The other abutments for the springs 12 are not shown. The depth of the cut to be made is adjusted by an adjustable stop screw 15 mounted in a stationary support bracket 16 which also carries the bearing 14.

The method according to the invention is particularly suitable in all cases in which a thermoplastic blank for a cam must be subsequently machined in the same manner for a substantial number of cam discs. It is obvious that with some skill this operation can be manually controlled so that the divider 8, 9, 10 is not necessary.

I claim:

An apparatus for manufacturing a cam from a thermoplastic blank, comprising a cutting disk; means for continuously rotating said disk about an axis, said disk having a peripheral face of substantially circular radial cross section defining a plane radial relative to said axis, said disk having a side face angularly extending from said peripheral face in a radial direction; a stationary support member for supporting the blank; bearing means pivotal on said support member about a pivot axis parallel to the axis of rotation of said cutting disk; a shaft rotatable on said bearing means about an axis in said plane and transverse of the axis of rotation of said cutting disk; means for securing said blank to a portion of said shaft spaced from said bearing means; a circular disk coaxially fastened to said shaft, said disk having a plurality of circumferentially spaced notches; spring-biased detent means on said bearing means selectively engageable with said notches for securing said shaft in a selected angular position; first actuating means for actuating movement of said support member in said plane relative to said peripheral face for cutting engagement thereof with the blank, said first actuating means including a resilient member permanently urging said shaft to pivot about said pivot axis for movement of a blank secured to said shaft portion toward said cutting disk in said plane; and second actuating means independent of said first means for actuating rotary movement of said support member about said transverse axis while said blank is in cutting engagement with said cutting disk.

References Cited in the file of this patent

UNITED STATES PATENTS

| | | |
|---|---|---|
| 1,643,089 | Ray et al. | Sept. 20, 1927 |
| 1,929,117 | Leyner et al. | Oct. 3, 1933 |
| 2,044,527 | Green | June 16, 1936 |
| 2,271,848 | Tcimpidis | Feb. 3, 1942 |
| 2,580,716 | Balamuth | Jan. 1, 1952 |
| 2,629,899 | Aller | Mar. 3, 1953 |
| 2,677,747 | Jaye | May 4, 1954 |
| 2,851,882 | Anania | Sept. 16, 1958 |
| 2,862,231 | Voigt | Dec. 2, 1958 |
| 2,884,839 | Steuby | May 5, 1959 |
| 2,956,464 | Charron | Oct. 18, 1960 |

FOREIGN PATENTS

| | | |
|---|---|---|
| 1,001,943 | Germany | Jan. 31, 1957 |